US012669688B2

(12) United States Patent
Lin

(10) Patent No.: US 12,669,688 B2
(45) Date of Patent: Jun. 30, 2026

(54) IMAGING LENS SYSTEM FOR TRACKING CELESTIAL BODY

(71) Applicant: TAIWAN SPACE AGENCY, Hsinchu (TW)

(72) Inventor: Sheng-Feng Lin, Hsinchu (TW)

(73) Assignee: TAIWAN SPACE AGENCY, Hsinchu (TW)

( * ) Notice: Subject to any disclaimer, the term of this patent is extended or adjusted under 35 U.S.C. 154(b) by 264 days.

(21) Appl. No.: 18/241,513

(22) Filed: Sep. 1, 2023

(65) Prior Publication Data

US 2024/0118524 A1     Apr. 11, 2024

(30) Foreign Application Priority Data

Sep. 23, 2022    (TW) ................................. 111136241

(51) Int. Cl.
*G02B 13/04*          (2006.01)
*G02B 9/14*           (2006.01)

(52) U.S. Cl.
CPC .............. *G02B 13/04* (2013.01); *G02B 9/14* (2013.01)

(58) Field of Classification Search
CPC .................... G02B 9/14–32; G02B 15/143105
See application file for complete search history.

(56) References Cited

U.S. PATENT DOCUMENTS 2,578,624 A * 12/1951 Back ........................ G02B 9/12
                                                         359/774
4,240,700 A * 12/1980 Ogawa ........... G02B 15/143105
                                                         359/677

(Continued)

FOREIGN PATENT DOCUMENTS

| CN | 105467570 B | 6/2018 | |
| CN | 207946588 U | 10/2018 | |
| JP | 2006284788 A * | 10/2006 | ............. G02B 7/021 |

OTHER PUBLICATIONS

Gross et al. "Handbook of Optical Systems vol. 3: Aberration Theory and Correction of Optical Systems" Weinheim Germany, WILEY-VCH Verlag GmbH & Co. KGaA, pp. 377-379 (Year: 2007).*

(Continued)

*Primary Examiner* — Cara E Rakowski
(74) *Attorney, Agent, or Firm* — CKC & Partners Co., LLC

(57)          ABSTRACT

An imaging lens system for tracking a celestial body includes, sequentially in a direction from the object side to the image side: a first lens group including, sequentially in the foregoing direction, either a negative-dioptric-power and two positive-dioptric-power lens elements, or a positive-dioptric-power, a negative-dioptric-power, and another positive-dioptric-power lens element; a second lens group including two negative-dioptric-power lens elements; and a third lens group including, sequentially in the foregoing direction, either a positive-dioptric-power, a negative-dioptric-power, and another positive-dioptric-power lens element, or two positive-dioptric-power, a negative-dioptric-power, and another positive-dioptric-power lens element. An aperture stop is located at the center of the imaging lens system symmetrically, allowing marginal rays to pass through the center of each lens element. The positive- and negative-dioptric-power lens elements contribute to a balanced field curvature. A wide system aperture (f/1.4) and a relatively wide field of view)(FOV<28°) result from the characteristic of an inverted telephoto configuration.

7 Claims, 11 Drawing Sheets

(56)  References Cited

U.S. PATENT DOCUMENTS

| | | | | |
|---|---|---|---|---|
| 4,449,791 | A | * | 5/1984 | Terasawa ....... G02B 15/143105 |
| | | | | 359/690 |
| 4,852,984 | A | * | 8/1989 | Takahashi .............. G02B 13/02 |
| | | | | 359/740 |
| 5,861,999 | A | | 1/1999 | Tada |
| 7,301,578 | B2 | | 11/2007 | Ohzawa et al. |
| 2008/0285150 | A1 | * | 11/2008 | Souma ........... G02B 15/143105 |
| | | | | 359/683 |
| 2015/0253542 | A1 | * | 9/2015 | Lin ........................ G02B 13/06 |
| | | | | 348/148 |
| 2018/0017769 | A1 | * | 1/2018 | Meng ....................... G02B 9/16 |
| 2021/0103124 | A1 | * | 4/2021 | Chen ................. G02B 13/0065 |
| 2022/0214527 | A1 | * | 7/2022 | Hua ................... G02B 13/0035 |
| 2023/0176346 | A1 | * | 6/2023 | Niu ........................ G03B 30/00 |
| | | | | 359/689 |

OTHER PUBLICATIONS

Machine translation of JP 2006284788 A retrieved electronically from PE2E Search Aug. 23, 2025 (Year: 2025).*
José Sasián et al., "Introduction to Lens Design", Cambridge University Press, 2019, p. 81, https://doi.org/10.1017/9781108625388. 001.
Julie Bentley et al., "Field Guide to Lens Design", SPIE Press, 2012, pp. 27, 55 and 117, https://doi.org/10.1117/3.934997.
Rudolf Kingslake et al., "Lens Design Fundamentals", Academic Press, 2010, p. 137, https://doi.org/10.1016/C2009-0-22069-1.

* cited by examiner

IMAGING LENS SYSTEM FOR TRACKING CELESTIAL BODY

BACKGROUND OF THE INVENTION

1. Technical Field

The present invention relates to an imaging lens system and more particularly to an imaging lens system for tracking a celestial body to facilitate the position and attitude control of an artificial satellite.

2. Description of Related Art

Imaging lenses for tracking stars are important components of an artificial satellite position and attitude control system, and the performance of the imaging lenses determines how well the artificial satellite position and attitude control function can be carried out. With the rapid development of the artificial satellite industry, and the increase in the applications of cameras, more and more requirements have been imposed on the resolving power and apertures of lenses and on the use of lenses in the extreme-temperature vacuum space environment. Currently, some notable examples of wide-aperture lenses on the market are the Petzval lens, the double-Gauss lens, and the Sonnar lens. However, the significant variations of extreme temperatures in the space environment make it impossible to use lens sets composed of cemented achromatic doublet or triplet lenses, such as the one disclosed in U.S. Pat. No. 5,861,999. An alternative to the foregoing type of lenses is a highly symmetric lens set structure known as the Cooke triplet.

Many optical lens systems nowadays use a combination of glass lenses and plastic lenses, such as the one disclosed in China Patent No. 207946588. In the space environment, however, the significant variations of extreme temperatures call for the use of optical materials made entirely of glass.

In addition, modern optical lens systems such as the one disclosed in U.S. Pat. No. 7,301,578 B2 tend to include many aspheric optical surfaces to enhance system performance. However, given the intense vibrations caused by the launch of a spacecraft and the significant variations of extreme temperatures in the space environment, lenses for use in a spacecraft cannot but be spherical glass lenses, which have higher tolerances than their aspheric counterparts. The lens system of the present invention, therefore, is a combination of lenses that are separate from one another, are made entirely of glass, and have completely spherical surfaces.

Moreover, although catadioptric optical designs have been used in lens systems for taking images in space, in particular optical imaging systems for capturing the images of stars in order to control the positions and attitudes of spacecraft, such as the one disclosed in China Patent No. 105467570, these bulky systems do not meet the structural requirements of microsatellites, which have limitations in volume and weight. Therefore, instead of a catadioptric lens design, the present invention uses a complicated-refractive-type Cooke lens structure.

SUMMARY OF THE INVENTION

As far as aircraft and ship navigation is concerned, inertial gyroscopes are the most commonly used navigation equipment today. An inertial gyroscope is highly precise in measuring transient positions and attitudes but tends to have a significant drift after long-term use, with errors accumulating over time and requiring correction with external information. A star tracker, on the other hand, takes advantage of the fact that the position of a star remains unchanged in an astronomical coordinate system, so there is no accumulation of positional errors or attitude errors in a star tracker. This explains why a star tracker has become the optimal system for correcting the position and attitude measurement errors in an inertial navigation system.

Besides, the principle of symmetry allows wavefront aberrations associated with a certain lens parameter raised to the power of an odd number (e.g., comatic aberration, distortion, and lateral chromatic aberration) to be suppressed. Therefore, the lens system of the present invention is a symmetric Cooke lens set with three lens groups (i.e., a positive lens group, a negative lens group, and another positive lens group, in that order) and an aperture stop at the center. For suitability in the space environment, the lens system necessitates a substantial light-gathering capability through a wide system aperture with an f-number lower than 1.6, and to this end, each lens group may have to comprise two, three, or even four lenses of a complicated-refractive-type Cooke lens structure.

Furthermore, a relatively wide field of view is required for observing a sufficiently large number of stars, so there must be limitations on the ratio of the effective focal length of the lens system to the diagonal length of the digital image sensor of the recording medium. And because of that, the lens system of the present invention uses an inverted telephoto configuration, i.e., with the total length TTL of the lens system greater than the effective focal length EFL of the lens system.

In order for the lens system to have a relatively flat image field, the lens system must include lenses with a positive dioptric power value (hereinafter also referred to as positive lenses) and lenses with a negative dioptric power value (hereinafter also referred to as negative lenses). The convex lenses and the concave lenses in the lens system of the present invention are balanced in number to meet the requirement that the ratio of the radius of field curvature to the effective focal length of the lens system must be greater than 3, as calculated with the image field equation of the Petzval sum:

$$\Phi_p = -\sum \frac{\Phi_i}{n_i}$$

To make it easy for the lens system to take images of distant stars when used in a star tracker, and to ensure that adjustments of the focal length of the lens system are always conveniently traceable in validations performed after assembly of the lens system, the focal point of the lens system is generally set at a point twice as far as the depth-of-field near point; that is to say, the focal point is generally set at a hyperfocal distance:

$$Dist_{hyperfocal} = \frac{efl^2}{C * F/\#}$$

where: C is the diameter of the circle of confusion, F/# is the f-number, and efl is the effective focal length. Consequently, the depth-of-field far point of the lens system is at a point at infinity.

The present invention provides an imaging lens system for tracking a celestial body. The imaging lens system includes, sequentially in a direction from the object side to the image side, a first lens group, a second lens group, and a third lens group. The first lens group is composed of a plurality of lens elements, and the ratio of the focal length of the first lens group to the effective focal length of the imaging lens system is greater than 0.678 and less than 1.076. The second lens group is composed of a plurality of lens elements each having a negative dioptric power value, and the ratio of the focal length of the second lens group to the effective focal length of the imaging lens system is greater than −0.461 and less than −0.377. The third lens group is composed of a plurality of lens elements, and the ratio of the focal length of the third lens group to the effective focal length of the imaging lens system is greater than 0.498 and less than 0.583.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE INVENTION

Figure 1:
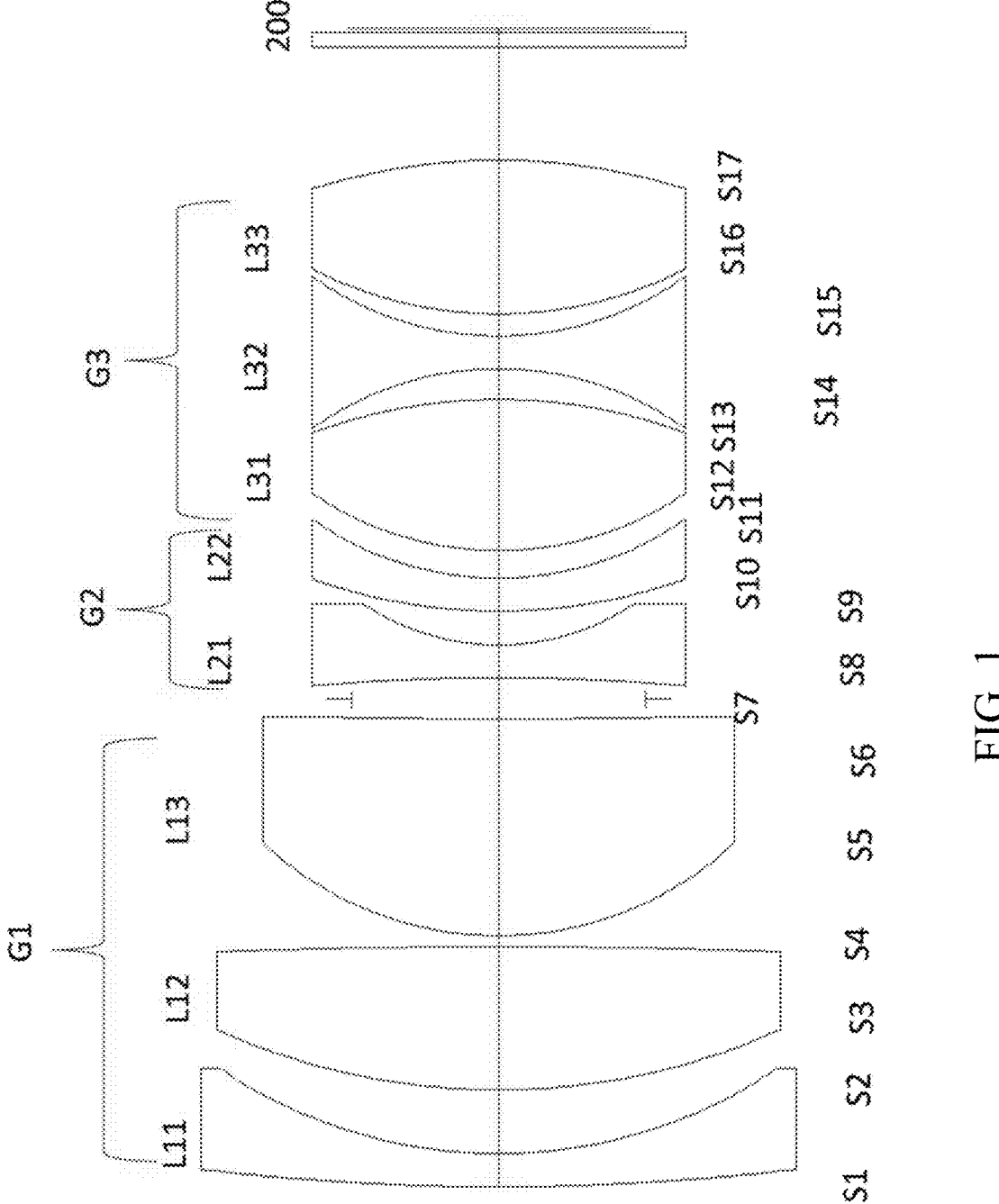
FIG. 1 shows the eight-lens-element structure of the first preferred embodiment of the invention.
Figure 2:
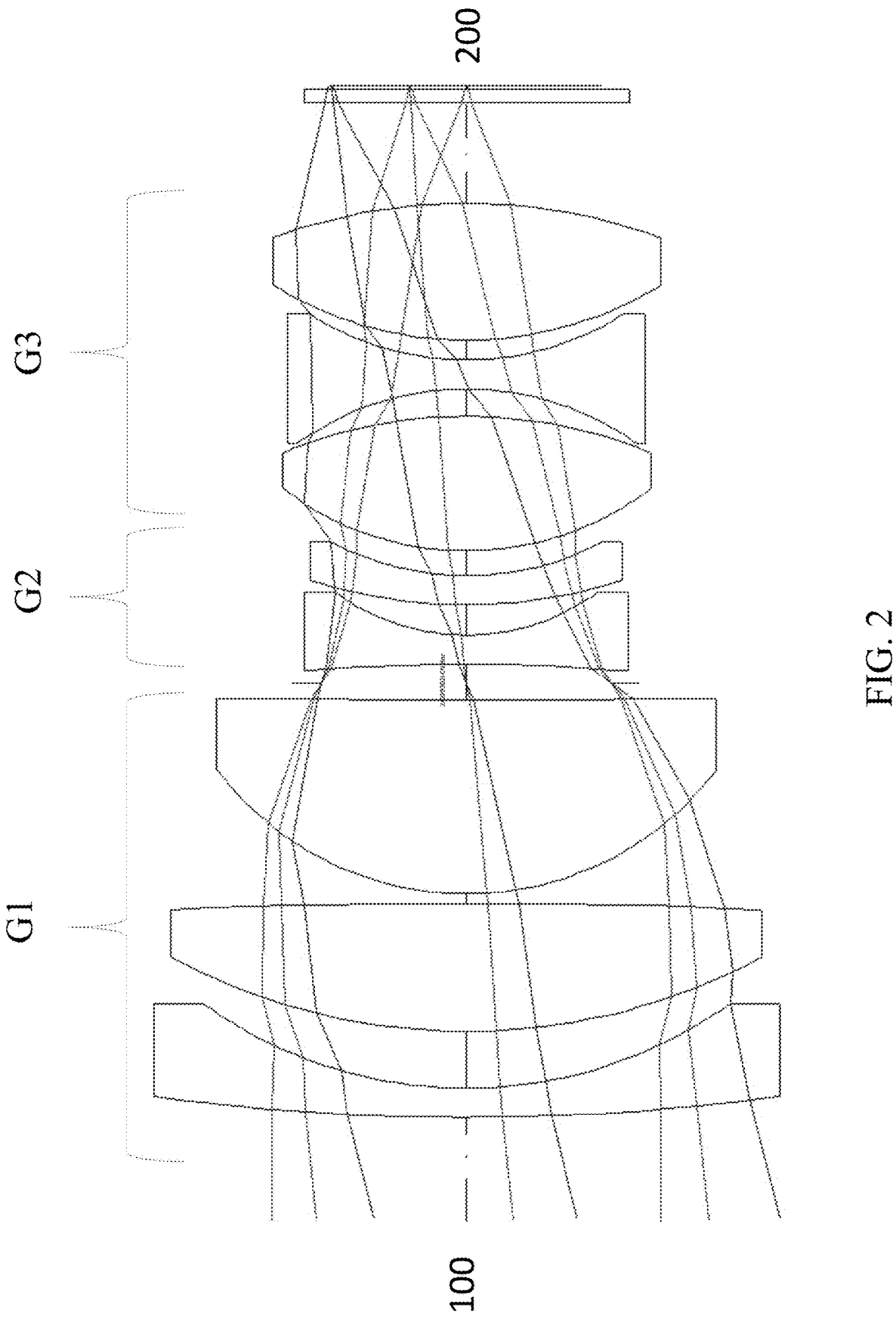
FIG. 2 is a ray tracing diagram of the eight-lens-element structure of the first preferred embodiment of the invention.
Figure 3:
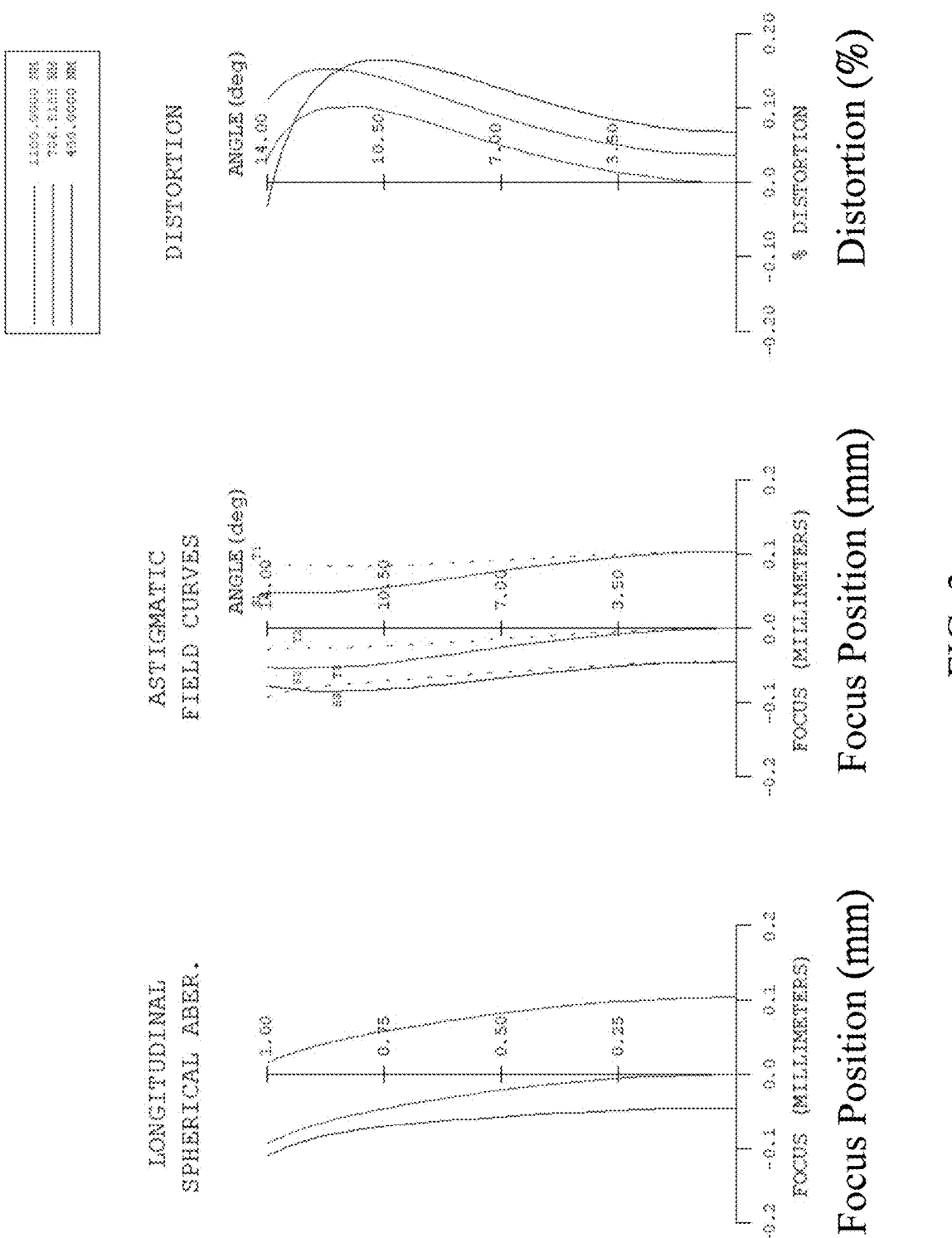
FIG. 3 shows the longitudinal spherical aberration curves, astigmatic field curves, and distortion curves of the eight-lens-element structure of the first preferred embodiment of the invention.
Figure 4:
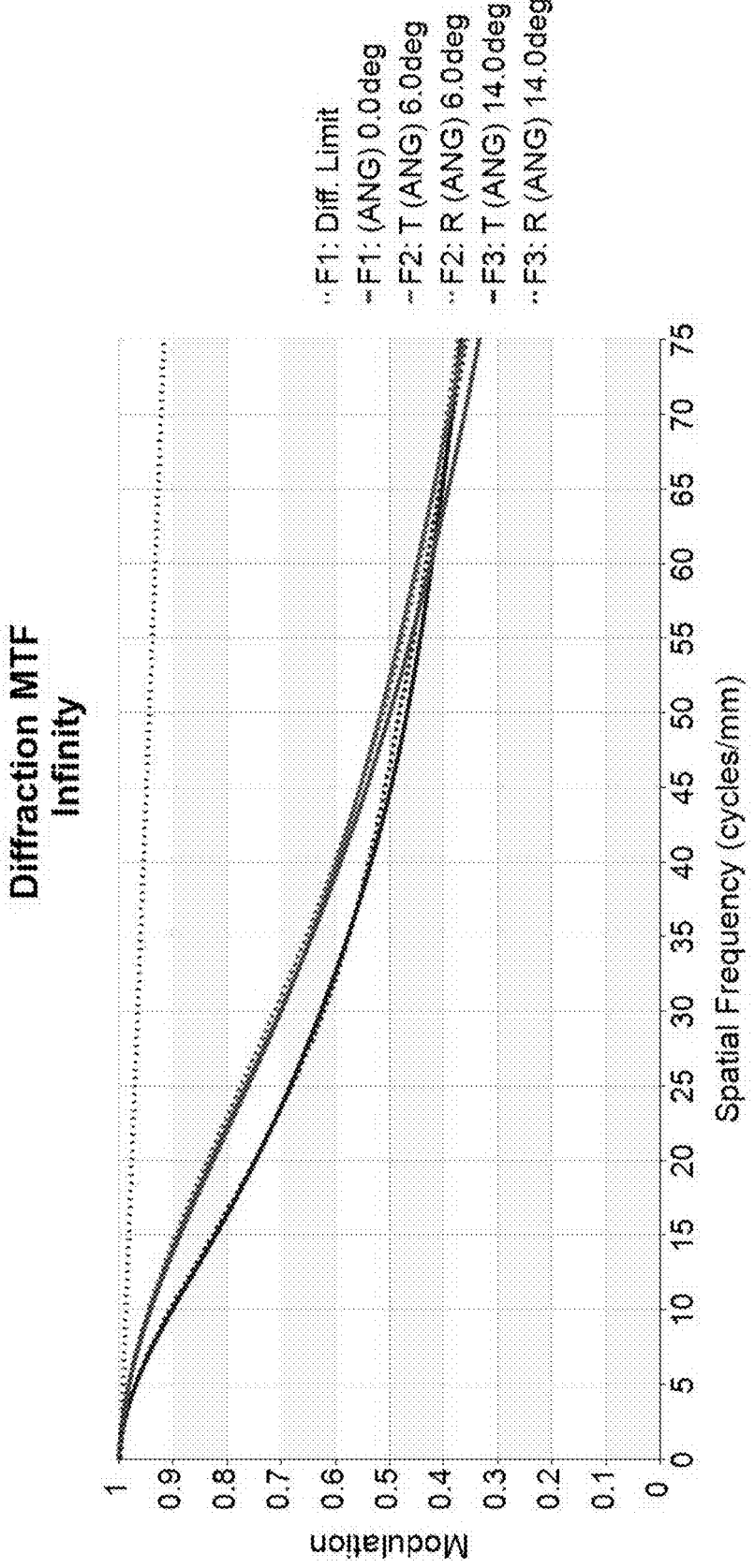
FIG. 4 is a modulation transfer function (MTF) chart of the eight-lens-element structure of the first preferred embodiment of the invention.
Figure 5:
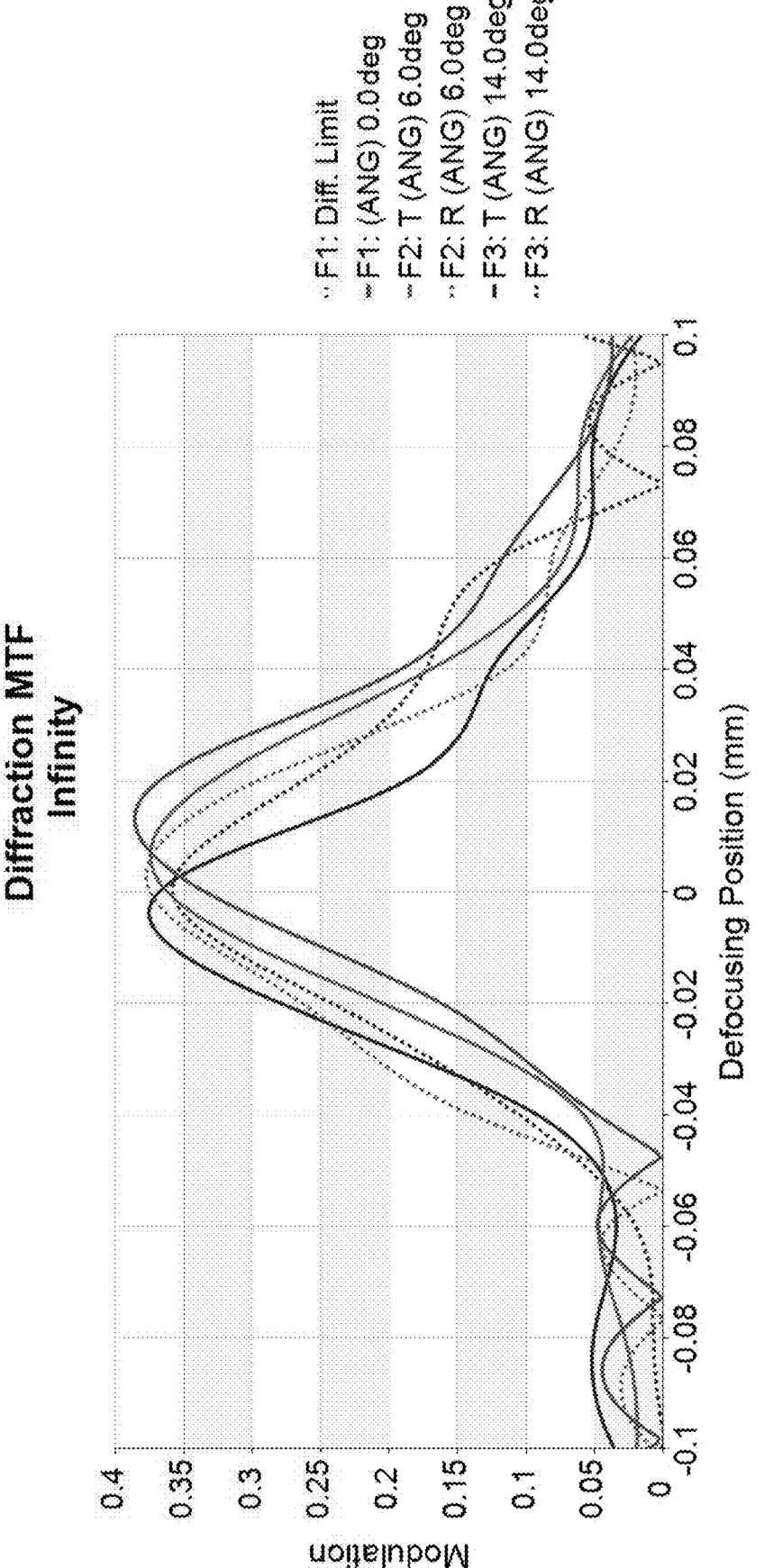
FIG. 5 is a chart showing the MTFs of the eight-lens-element structure of the first preferred embodiment of the invention through predetermined defocusing positions around the focal plane.

Referring to FIG. 1, the first preferred embodiment of the present invention is a lens system with three lens groups and a total of eight lens elements. More specifically, the lens system includes, sequentially in a direction from the object side 100 to the image side 200, a first lens group G1, an aperture stop, a second lens group G2, and a third lens group G3. The first lens group G1 includes three lens elements, which are a negative lens element (i.e., a lens element with a negative dioptric power value), a positive lens element (i.e., a lens element with a positive dioptric power value), and another positive lens element sequentially arranged in the direction from the object side 100 to the image side 200. The second lens group G2 includes two negative lens elements sequentially arranged in the direction from the object side 100 to the image side 200. The third lens group G3 includes three lens elements, which are a positive lens element, a negative lens element, and another positive lens element sequentially arranged in the direction from the object side 100 to the image side 200. The lens system in this preferred embodiment is suitable for use with a system wavelength longer than 0.4 μm and shorter than 1.1 μm. The lens system has an effective focal length of 16.2 mm, with the first lens group G1 having a focal length of 11.57 mm, whose ratio to the effective focal length of the lens system is 0.7; the second lens group G2 having a focal length of −6.44 mm, whose ratio to the effective focal length of the lens system is −0.4; and the third lens group G3 having a focal length of 9.01 mm, whose ratio to the effective focal length of the lens system is 0.55. The f-number of the lens system in the first preferred embodiment is 1.4. FIG. 2 is a ray tracing diagram of the first preferred embodiment, and it can be seen in FIG. 2 that the lens system has good focusing performance. FIG. 3 shows the longitudinal spherical aberration curves, astigmatic field curves, and distortion curves of this preferred embodiment. FIG. 4 shows the resolving power of the lens system in this preferred embodiment, and it can be seen in FIG. 4 that the contrast ratio is higher than 25%, given 75 pairs of black and white lines per millimeter. FIG. 5 is a chart showing the MTFs of different fields of view of the lens system in the first preferred embodiment through predetermined defocusing positions around the focal plane, and it can be seen in FIG. 5 that the peak values of the MTFs are highly concentrated.

The radii of curvature and thicknesses of the lens elements, and the refractive index and Abbe number of the glass material of each lens element, in the lens system in the first preferred embodiment are shown in Table 1.

TABLE 1

Lens parameters of the three-group eight-lens-element system
in the first preferred embodiment of the present invention
Effective focal length: 16.2 mm, focal ratio: F/1.4, FOV = 28°

| Curved surface no. | Radius of curvature (mm) | Thickness (mm) | Refractive index $n_d$ | Abbe number $v_d$ |
|---|---|---|---|---|
| OBJ | Infinity | Infinity | | |
| 1 | 68.992 | 0.88 | 1.603 | 38.0 |
| 2 | 13.361 | 1.71 | | |
| 3 | 18.483 | 3.84 | 1.785 | 44.2 |
| 4 | −212.375 | 0.3 | | |
| 5 | 9.281 | 5.81 | 1.691 | 54.8 |
| 6 | 236.409 | 0.52 | | |
| 7 # | Infinity | 0.58 | | |
| 8 | −57.688 | 0.88 | 1.688 | 31.0 |
| 9 | 6.539 | 0.91 | | |
| 10 | 15.086 | 0.88 | 1.698 | 30.1 |
| 11 | 8.716 | 0.74 | | |
| 12 | 8.938 | 4.05 | 1.882 | 40.7 |
| 13 | −14.313 | 0.82 | | |
| 14 | −8.645 | 0.88 | 1.698 | 30.1 |
| 15 | 8.645 | 0.59 | | |
| 16 | 10.94 | 4.12 | 1.882 | 40.7 |
| 17 | −16.676 | 3.0163 | | |
| 18 | Infinity | 0.4 | 1.523 | 54.4 |
| 19 | Infinity | 0.125 | | |
| 20 | Infinity | | | |

5

Figure 6:
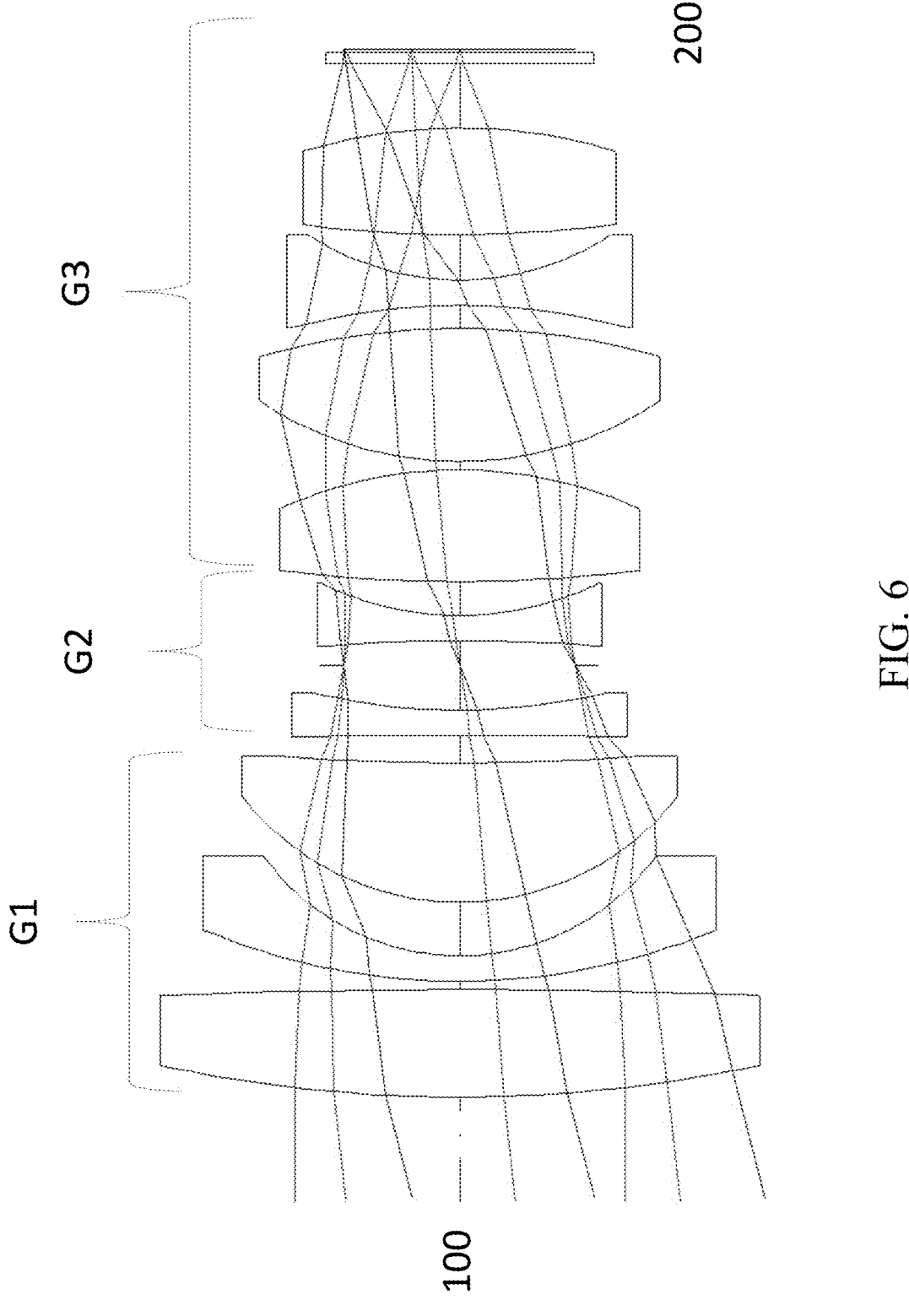
FIG. 6 is a ray tracing diagram of the nine-lens-element structure of the second preferred embodiment of the invention.
Figure 7:
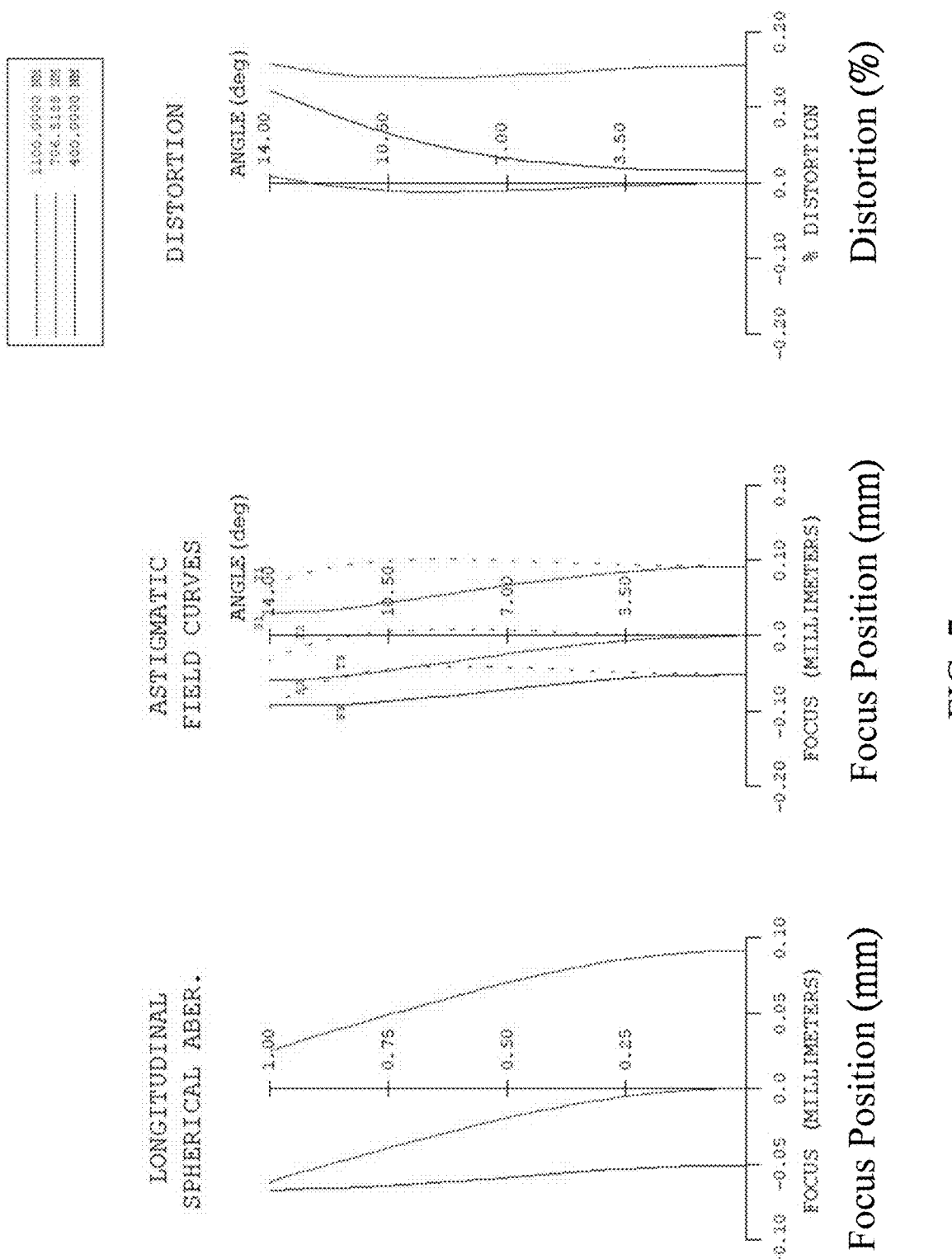
FIG. 7 shows the longitudinal spherical aberration curves, astigmatic field curves, and distortion curves of the nine-lens-element structure of the second preferred embodiment of the invention.
Figure 8:
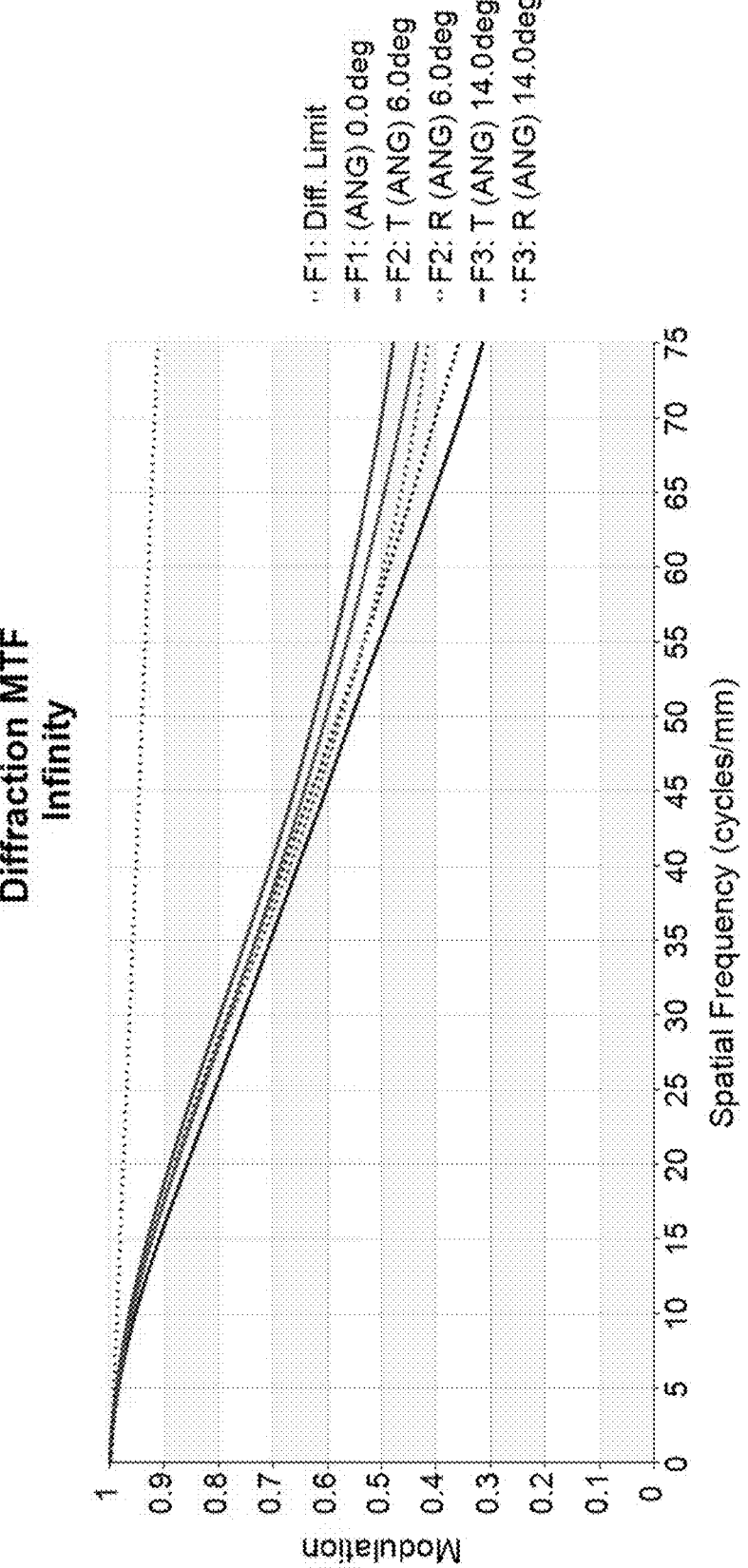
FIG. 8 is an MTF chart of the nine-lens-element structure of the second preferred embodiment of the invention.

The second preferred embodiment of the present invention is a lens system with three lens groups and a total of nine lens elements and is suitable for use with a system wavelength longer than 0.4 µm and shorter than 1.1 µm. As shown in FIG. 6, this lens system includes, sequentially in the direction from the object side 100 to the image side 200, a first lens group G1, a second lens group G2 with an aperture stop disposed therein, and a third lens group G3. The first lens group G1 includes three lens elements, which are a positive lens element, a negative lens element, and another positive lens element sequentially arranged in the direction from the object side 100 to the image side 200. The second lens group G2 includes two negative lens elements sequentially arranged in the direction from the object side 100 to the image side 200, and the aperture stop is disposed between the two negative lens elements. The third lens group G3 includes four lens elements, which are a positive lens element, another positive lens element, a negative lens element, and yet another positive lens element sequentially arranged in the direction from the object side 100 to the image side 200. The lens system in this preferred embodiment has an effective focal length of 16.2 mm, with the first lens group G1 having a focal length of 16.62 mm, whose ratio to the effective focal length of the lens system is 1.02; the second lens group G2 having a focal length of −7.13 mm, whose ratio to the effective focal length of the lens system is −0.44, and the third lens group G3 having a focal length of 8.51 mm, whose ratio to the effective focal length of the lens system is 0.52. The f-number of the lens system in the second preferred embodiment is 1.4. FIG. 6 also shows a ray tracing diagram of the second preferred embodiment, and it can be seen in FIG. 6 that the lens system has good focusing performance. FIG. 7 shows the longitudinal spherical aberration curves, astigmatic field curves, and distortion curves of the second preferred embodiment. FIG. 8 is an MTF chart showing the resolving power of the lens system in this preferred embodiment, and it can be seen in FIG. 8 that the contrast ratio is higher than 25%, given 75 pairs of black and white lines per millimeter.

The radii of curvature and thicknesses of the lens elements, and the refractive index and Abbe number of the glass material of each lens element, in the lens system in the second preferred embodiment are shown in Table 2.

TABLE 2

Lens parameters of the three-group nine-lens-element system in the second preferred embodiment of the present invention
Effective focal length: 16.2 mm, focal ratio: F/1.4, FOV = 28°

| Curved surface no. | Radius of curvature (mm) | Thickness (mm) | Refractive index n_d | Abbe number v_d |
|---|---|---|---|---|
| OBJ | Infinity | Infinity | | |
| 1 | 49.590 | 3.81 | 1.691 | 54.84 |
| 2 | −259.012 | 0.30 | | |
| 3 | 23.130 | 0.90 | 1.518 | 53.78 |
| 4 | 8.455 | 1.90 | | |
| 5 | 9.658 | 4.94 | 1.883 | 40.78 |
| 6 | 80.719 | 0.97 | | |
| 7 | −406.269 | 0.90 | 1.847 | 23.78 |
| 8 | 21.408 | 1.58 | | |
| 9 # | Infinity | 0.88 | | |
| 10 | −63.538 | 0.90 | 1.847 | 23.78 |
| 11 | 10.916 | 1.20 | | |
| 12 | 50.301 | 3.96 | 1.883 | 40.78 |
| 13 | −15.014 | 0.30 | | |
| 14 | 12.543 | 4.71 | 1.883 | 40.78 |
| 15 | −24.837 | 0.82 | | |
| 16 | −22.033 | 0.90 | 1.705 | 28.80 |
| 17 | 9.577 | 1.62 | | |

6

TABLE 2-continued

Lens parameters of the three-group nine-lens-element system in the second preferred embodiment of the present invention
Effective focal length: 16.2 mm, focal ratio: F/1.4, FOV = 28°

| Curved surface no. | Radius of curvature (mm) | Thickness (mm) | Refractive index n_d | Abbe number v_d |
|---|---|---|---|---|
| 18 | 45.203 | 3.77 | 1.746 | 49.08 |
| 19 | −18.709 | 2.28 | | |
| 20 | Infinity | 0.4 | 1.523 | 54.49 |
| 21 | Infinity | 0.125 | | |
| 22 | Infinity | 0 | | |

Figure 9:
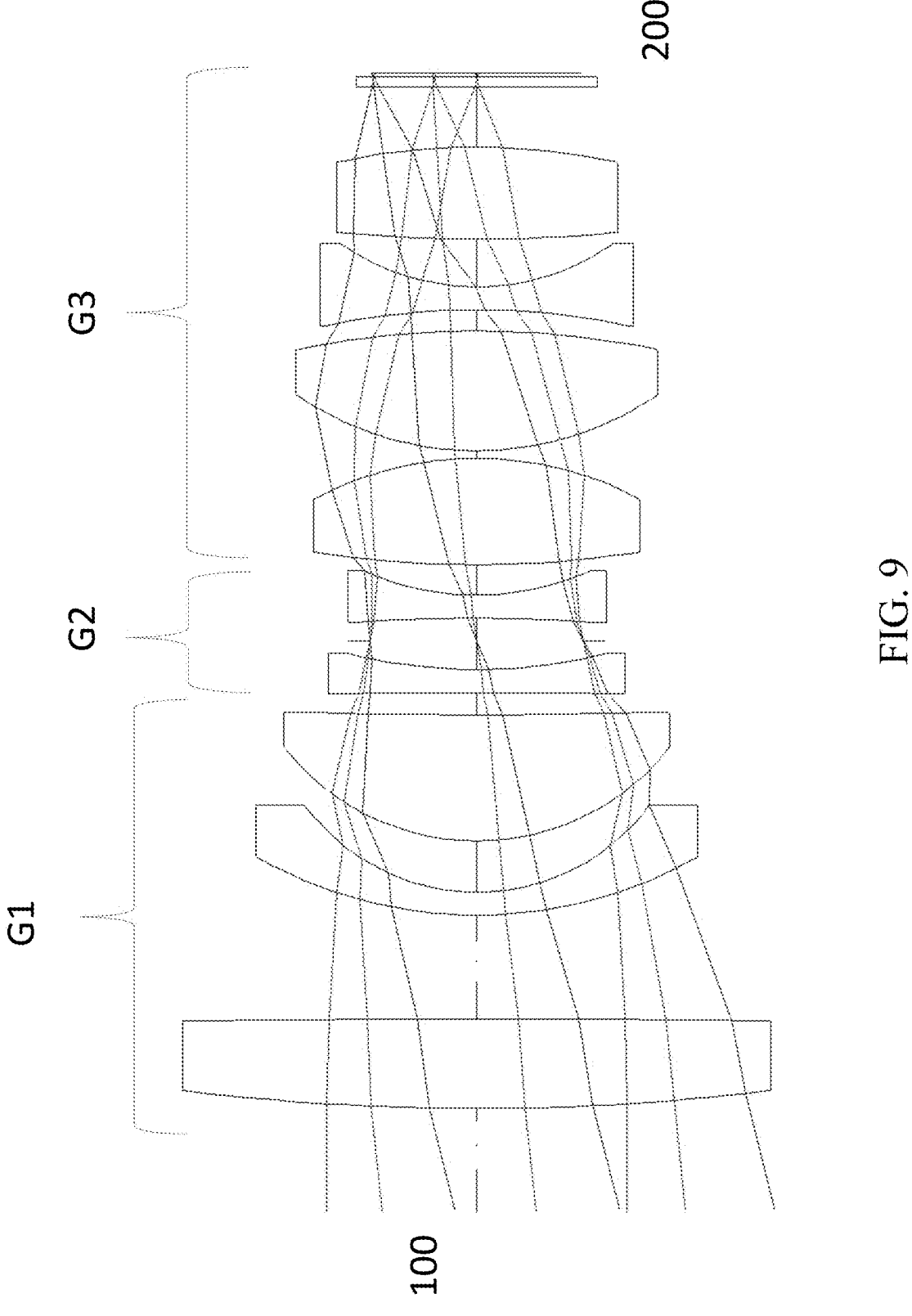
FIG. 9 is a ray tracing diagram of the nine-lens-element structure of the third preferred embodiment of the invention.
Figure 10:
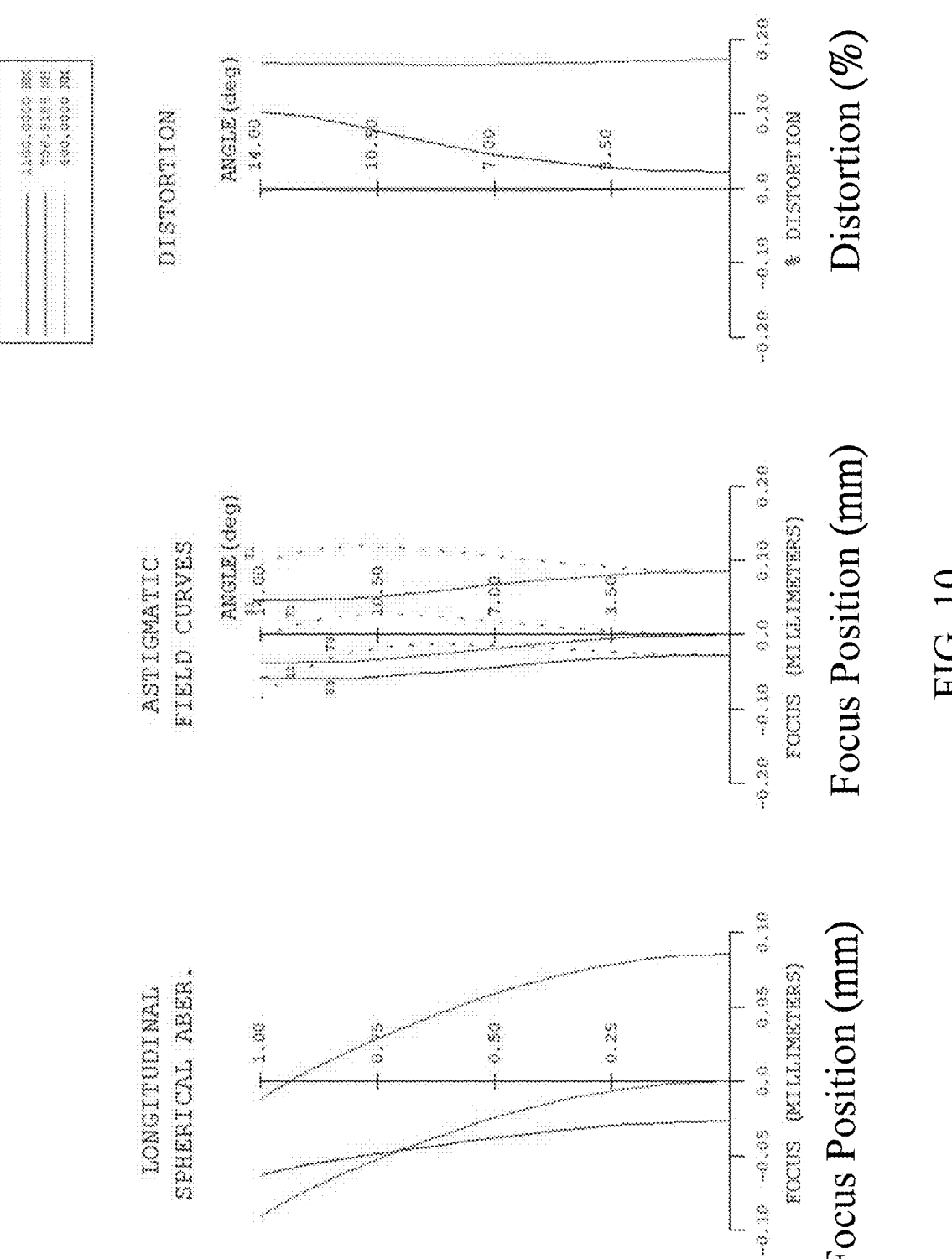
FIG. 10 shows the longitudinal spherical aberration curves, astigmatic field curves, and distortion curves of the nine-lens-element structure of the third preferred embodiment of the invention.
Figure 11:
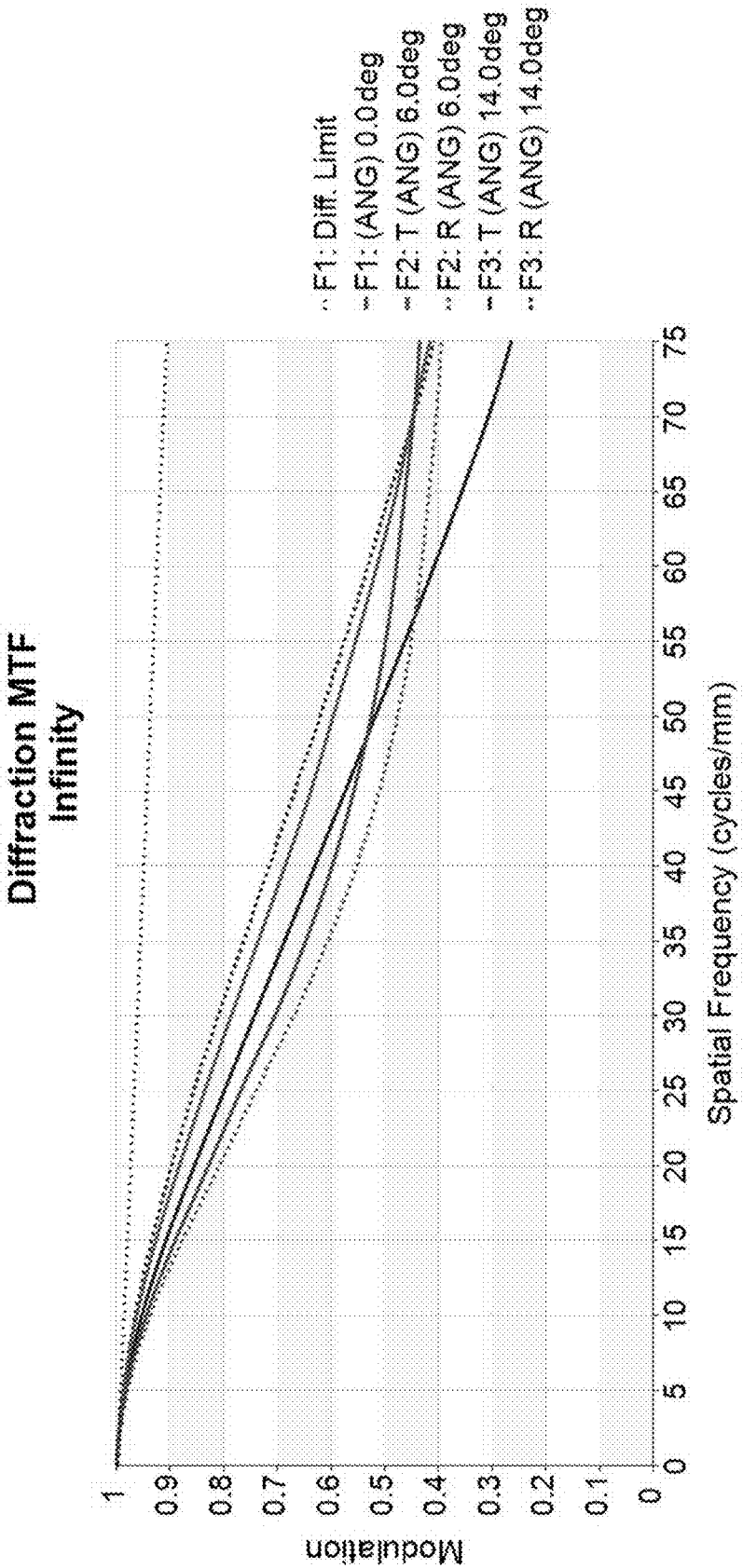
FIG. 11 is an MTF chart of the nine-lens-element structure of the third preferred embodiment of the invention.

The third preferred embodiment of the present invention is a lens system with three lens groups and a total of nine lens elements and is suitable for use with a system wavelength longer than 0.4 µm and shorter than 1.1 µm. As shown in FIG. 9, this lens system includes, sequentially in the direction from the object side 100 to the image side 200, a first lens group G1, a second lens group G2 with an aperture stop disposed therein, and a third lens group G3. The first lens group G1 includes three lens elements, which are a positive lens element, a negative lens element, and another positive lens element sequentially arranged in the direction from the object side 100 to the image side 200. The second lens group G2 includes two negative lens elements sequentially arranged in the direction from the object side 100 to the image side 200, and the aperture stop is disposed between the two negative lenses. The third lens group G3 includes four lens elements, which are a positive lens element, another positive lens element, a negative lens element, and yet another positive lens element sequentially arranged in the direction from the object side 100 to the image side 200. The lens system in this preferred embodiment has an effective focal length of 16.2 mm, with the first lens group G1 having a focal length of 15.72 mm, whose ratio to the effective focal length of the lens system is 0.97; the second lens group G2 having a focal length of −6.89 mm, whose ratio to the effective focal length of the lens system is −0.42; and the third lens group G3 having a focal length of 8.54 mm, whose ratio to the effective focal length of the lens system is 0.52. The f-number of the lens system in the third preferred embodiment is 1.4. FIG. 9 also shows a ray tracing diagram of the third preferred embodiment, and it can be seen in FIG. 9 that the lens system has good focusing performance. FIG. 10 shows the longitudinal spherical aberration curves, astigmatic field curves, and distortion curves of the third preferred embodiment. FIG. 11 shows the resolving power of the lens system in the third preferred embodiment, and it can be seen in FIG. 11 that the contrast ratio is higher than 25%, given 75 pairs of black and white lines per millimeter.

The radii of curvature and thicknesses of the lens elements, and the refractive index and Abbe number of the glass material of each lens element, in the lens system in the third preferred embodiment are shown in Table 3.

TABLE 3

Lens parameters of the three-group nine-lens-element system
in the third preferred embodiment of the present invention
Effective focal length: 16.2 mm, focal ratio: F/1.4, FOV = 28°

| Curved surface no. | Radius of curvature (mm) | Thickness (mm) | Refractive index $n_d$ | Abbe number $v_d$ |
|---|---|---|---|---|
| OBJ | Infinity | Infinity | | |
| 1 | 92.285 | 3.49 | 1.7902 | 26.61 |
| 2 | −703.753 | 4.04 | | |
| 3 | 17.015 | 0.90 | 1.5617 | 42.50 |
| 4 | 8.185 | 2.00 | | |
| 5 | 9.405 | 4.90 | 1.883 | 40.78 |
| 6 | 192.639 | 0.88 | | |
| 7 | −398.555 | 0.90 | 1.847 | 23.78 |
| 8 | 20.143 | 1.11 | | |
| 9 # | Infinity | 0.89 | | |
| 10 | −62.123 | 0.90 | 1.847 | 23.78 |
| 11 | 10.525 | 1.18 | | |
| 12 | 39.821 | 4.15 | 1.748 | 48.92 |
| 13 | −13.173 | 0.30 | | |
| 14 | 12.162 | 4.66 | 1.883 | 40.78 |
| 15 | −33.809 | 0.82 | | |
| 16 | −27.623 | 0.90 | 1.644 | 32.72 |
| 17 | 9.014 | 1.85 | | |
| 18 | 53.881 | 3.59 | 1.883 | 40.78 |
| 19 | −24.878 | 2.352621 | | |
| 20 | Infinity | 0.4 | 1.523 | 54.49 |
| 21 | Infinity | 0.125 | | |
| 22 | Infinity | 0 | | |

The focal lengths of the lens groups in the first to the third preferred embodiments are summarized in Table 4.

TABLE 4

Focal length of each lens group in the first to the
third preferred embodiments of the present invention

| | Effective focal length EFL (mm) | Focal length of first lens group (mm) | Focal length of second lens group (mm) | Focal length of third lens group (mm) |
|---|---|---|---|---|
| Embodiment 1 | 16.22 | 11.57 | −6.44 | 9.01 |
| Embodiment 2 | 16.22 | 16.62 | −7.13 | 8.51 |
| Embodiment 3 | 16.21 | 15.72 | −6.89 | 8.54 |

The focal length of each lens group in the first to the third preferred embodiments is normalized by division by the effective focal length of the corresponding lens system, and each normalized ratio obtained is compared with the ratio of the focal length of the corresponding lens in the classical Cooke triplet in "Fundamental of Lens Design" by Kingslake to the effective focal length of the Cooke triplet, as shown in Table 5.

TABLE 5

Normalized focal length of each lens group in
the first to the third preferred embodiments

| | Effective focal length EFL (mm) | Focal length of first lens group (mm) | Focal length of second lens group (mm) | Focal length of third lens group (mm) |
|---|---|---|---|---|
| Embodiment 1 | 1 | 11.57/ 16.22 = 0.71 | −6.44/ 16.22 = −0.40 | 9.01/ 16.22 = 0.56 |
| Embodiment 2 | 1 | 16.62/ 16.22 = 1.02 | −7.13/ 16.22 = −0.44 | 8.51/ 16.22 = 0.52 |
| Embodiment 3 | 1 | 15.72/ 16.22 = 0.97 | −6.89/ 16.22 = −0.43 | 8.54/ 16.22 = 0.53 |

TABLE 5-continued

Normalized focal length of each lens group in
the first to the third preferred embodiments

| | Effective focal length EFL (mm) | Focal length of first lens group (mm) | Focal length of second lens group (mm) | Focal length of third lens group (mm) |
|---|---|---|---|---|
| Classical Cooke | 1 | 0.67 | −0.33 | 0.48 |

As shown in Table 5, the imaging lens system of the present invention for tracking a celestial body is so designed that the ratio of the focal length of the first lens group to the effective focal length of the imaging lens system is not less an 0.71 and not greater than 1.02, that the ratio of the focal length of the second lens group to the effective focal length of the imaging lens system is not less an −0.43 and not greater than −0.4, and that the ratio of the focal length of the third lens group to the effective focal length of the imaging lens system is not less an 0.52 and not greater than 0.56.

Generally, one design objective of a lens is for the ratio of the radius of field curvature of the lens to the focal length of the lens to be not less than 3. This ratio of each of the first to the third preferred embodiments is calculated as follows:

TABLE 6

The calculated ratio of the radius of field curvature to focal
length of each of the first to the third preferred embodiments

| | $\Phi_p = -\sum \dfrac{\Phi_i}{n_i}$ (diopter) | $\Phi_{efl}$ (diopter) | $\dfrac{\Phi_p}{\Phi_{efl}}$ | $R_p/\text{EFL}$, ratio of the radius of field curvature to focal length |
|---|---|---|---|---|
| Embodiment 1 | 5.393363 | 61.66787 | 0.087458 | 11.43 |
| Embodiment 2 | 18.75973 | 61.66217 | 0.304234 | 3.29 |
| Embodiment 3 | 17.49675 | 61.7044 | 0.283558 | 3.53 |

As shown in Table 6, $\Phi_p$ is the Petzval sum, $\Phi_{efl}$ is the reciprocal of the effective focal length, and $R_p/\text{EFL}$ is the ratio of the radius of field curvature to the effective focal length. The radius of field curvature of the lens system of the present invention is at least 3.29 times as great as the effective focal length. In particular, the radius of field curvature of the lens system in the first preferred embodiment is 11.43 times the effective focal length, which indicates a fairly flat-field lens system.

The imaging lens system of the present invention for tracking a celestial body has the characteristic of an inverted telephoto configuration, meaning the total length TTL of the imaging lens system is greater than the effective focal length EFL of the imaging lens system. More specifically, the total length from the first lens surface of the imaging lens system in the direction from the object side 100 to the image side 200 to the image plane and the total effective focal length of the first to the third lens groups are in a ratio not less an 1.92 and not greater than 2.49, as shown in the table below. The inverted telephoto configuration allows the imaging lens system for tracking a celestial body to have a wide system aperture (f/1.4) and a relatively wide field of view (FOV<28°) so that the imaging lens system is suitable for use in a star tracker.

|  | TTL (mm) | EFL (mm) | TTL/EFL |
|---|---|---|---|
| Embodiment 1 | 31.06 | 16.22 | 1.92 |
| Embodiment 2 | 37.17 | 16.22 | 2.29 |
| Embodiment 3 | 40.33 | 16.21 | 2.49 |

The above description is based on only a few preferred embodiments of the present invention and is not intended to limit the present invention in any way. Although the invention has been disclosed above by way of the preferred embodiments, those embodiments are not intended to limit the invention. A person skilled in the relevant art will recognize that equivalent embodiments can be achieved by modifying, varying, or making equivalent changes to the disclosed embodiments without departing from the scope of the technical solution of the invention. Any simple modification or equivalent change that is made to the above embodiments according to the material contents of the invention shall be regarded as falling within the scope of the technical solution of the invention.

What is claimed is:

1. An imaging fixed-focus lens system for tracking a celestial body, which is a complicated-refractive-type Cooke lens structure composed only of refractive optical elements, wherein all lens elements are made entirely of glass;
all lens elements are separate from one another, with no cemented lenses;
all surfaces of the lens elements are spherical, and
the imaging lens system comprises, sequentially in a direction from an object side to an image side of the imaging lens system:
a first lens group composed of a plurality of lens elements, wherein a ratio of a focal length of the first lens group to an effective focal length of the imaging lens system is greater than 0.678 and less than 1.076;
a second lens group composed of a plurality of lens elements each having a negative dioptric power value, wherein a ratio of a focal length of the second lens group to the effective focal length of the imaging lens system is greater than −0.461 and less than −0.377; and
a third lens group composed of a plurality of lens elements, wherein a ratio of a focal length of the third lens group to the effective focal length of the imaging lens system is greater than 0.498 and less than 0.583,
wherein the imaging lens system has an f-number greater than 1.4 and less than 1.6, and
wherein the imaging lens system has a characteristic of an inverted telephoto configuration, namely with a ratio of a total length from a first lens surface of the imaging lens system in the direction from the object side to the image side of the imaging lens system to an image plane to a total effective focal length of the first to third lens groups being greater than 1.82 and less than 2.61.

2. The fixed-focus imaging lens system for tracking a celestial body according to claim 1, wherein the first lens group comprises, sequentially in the direction from the object side to the image side of the imaging lens system, a lens element having a negative dioptric power value, a lens element having a positive dioptric power value, and another lens element having a positive dioptric power value; the second lens group comprises, sequentially in the direction from the object side to the image side of the imaging lens system, a lens element having a negative dioptric power value and another lens element having a negative dioptric power value; and
the third lens group comprises, sequentially in the direction from the object side to the image side of the imaging lens system, a lens element having a positive dioptric power value, a lens element having a negative dioptric power value, and another lens element having a positive dioptric power value.

3. The fixed-focus imaging lens system for tracking a celestial body according to claim 1, wherein the first lens group comprises, sequentially in the direction from the object side to the image side of the imaging lens system, a lens element having a positive dioptric power value, a lens element having a negative dioptric power value, and another lens element having a positive dioptric power value; the second lens group comprises, sequentially in the direction from the object side to the image side of the imaging lens system, a lens element having a negative dioptric power value and another lens element having a negative dioptric power value; and
the third lens group comprises, sequentially in the direction from the object side to the image side of the imaging lens system, a lens element having a positive dioptric power value, another lens element having a positive dioptric power value, a lens element having a negative dioptric power value, and yet another lens element having a positive dioptric power value.

4. The fixed-focus imaging lens system for tracking a celestial body according to claim 1, wherein each said lens element of the second lens group has a refractive index $n_d$ (group 2) greater than 1.687 and less than 1.849.

5. The fixed-focus imaging lens system for tracking a celestial body according to claim 1, wherein each said lens element of the second lens group has an Abbe number $v_d$ (group 2), which is a measure of dispersion parameter Abbe number, greater than 23.6 and less than 31.3.

6. The fixed-focus imaging lens system for tracking a celestial body according to claim 1, wherein the imaging lens system has a full-field-of-view (full FOV) angle greater than 25° and less than 28°.

7. The fixed-focus imaging lens system for tracking a celestial body according to claim 1, wherein the imaging lens system is suitable for use with a system wavelength longer than 0.4 μm and shorter than 1.1 μm.

* * * * *